United States Patent [19]

Grasmueller et al.

[11] Patent Number: 4,731,858

[45] Date of Patent: Mar. 15, 1988

[54] ARRANGEMENT FOR THE SEGMENTATION OF LINES

[75] Inventors: Hans Grasmueller, Mammendorf; Wilhelm Beutel, Munich; Karl Hohberger, Feldkirchen-Westerham; Paul Koellensperger; Anna Reischl, both of Munich; Peter Rummel, Festenbach, all of Fed. Rep. of Germany

[73] Assignee: Siemens Aktiengesellschaft, Berlin and Munich, Fed. Rep. of Germany

[21] Appl. No.: 726,763

[22] Filed: Apr. 24, 1985

[30] Foreign Application Priority Data

May 11, 1984 [DE] Fed. Rep. of Germany ....... 3417545

[51] Int. Cl.$^4$ .............................................. G06K 9/34
[52] U.S. Cl. ......................................... 382/9; 382/21; 382/22; 382/25
[58] Field of Search ........................... 382/9, 21, 22, 25

[56] References Cited

U.S. PATENT DOCUMENTS 3,268,864  8/1966  Kudo ..................................... 382/26
4,361,830  11/1982  Honma et al. ......................... 382/25
4,365,235  12/1982  Greanias et al. ...................... 382/13

FOREIGN PATENT DOCUMENTS 2108306  5/1983  United Kingdom .................. 382/25

OTHER PUBLICATIONS

Robinson, Guner S., "Detection and Coding of Edges Using Directional Masks", *Optical Engr.*, vol. 16, No. 6, 11/87-12/87, pp. 580-585.

Freeman, Herbert, "On the Encoding of Arbitrary Geometric Configurations", *IRE Trans. Electron. Comput.* vol. EC-10, pp. 260-268, 6/61.

Nudd et al., "Charge-Coupled Device Technology for Smart Sensors", *MIT, Darpa Image Understanding Workshop*, pp. 1-6, 5/3-4/78.

Proc. 4th Int. Joint Conf. on Artificial Intelligence, Tbilisi, USSR, 1975; "Edge Finding, Segmentation of Edges and Recognition of Complex Objects, Shirai, pp. 674-681.

IEEE Transactions on Computers, vol. C-27, No. 2, Feb., 1978, "A Model-Based Vision System for Industrial Parts", by W. A. Perkins, pp. 126-142.

*Primary Examiner*—Leo H. Boudreau
*Assistant Examiner*—Jose L. Couso
*Attorney, Agent, or Firm*—Hill, Van Santen, Steadman & Simpson

[57] ABSTRACT

A coarse or rough segmentation apparatus has been developed for use in a sensor system for analyzing halftone images. In contrast with previously employed methods, the apparatus is based on the pipeline principle. In the image picked up by the camera, edges of an object are represented in the form of a sequence of points of high contrast as compared with the surroundings. These edges are initially sought out and tracked by so-called edge tracking. Subsequently, in a rough or coarse segmentation, this line is divided into as large as possible contiguous pieces or sections of equal curvature and pieces or sections with a strong directional change.

6 Claims, 12 Drawing Figures 00
01
10
11

ARRANGEMENT FOR THE SEGMENTATION OF LINES

BACKGROUND OF THE INVENTION

The invention relates to an arrangement for the segmentation, classification and approximation of lines which are defined by a series of points, and whereby each point is determined by its coordinates and a directional angle.

The performance of the visual sensors for the position recognition of workpieces presently commercially available is generally not sufficient for use in flexible production situations in order to permit an economical and technically expedient use of such apparatus.

The sensors presently commercially available image the three dimensional scene which contains the workpieces into a binary image since the workpiece to be recognized stands out as a white area from the black background, or vice versa. This areal pattern, describing the silouette of the workpiece, is evaluated or analyzed with comparatively simple algorithms (for example, center of gravity calculation for position determination, determination of the axis of inertia, or "polar check" for rotational position determination). This type of evaluation or analysis assumes that various workpieces do not contact one another or overlap, but that, on the other hand, a workpiece will also not fall into several areas through the binary processing. Accordingly, for the recognition of non-isolated workpieces, the point of departure must be the gray scale value image (picture half-tone) in which edges are visible.

For the evaluation of picture halftone images, numerous algorithms exist which, however, generally are extremely computationally bound and normally do not enter into consideration for use in manufacturing automation on account of the required apparatus and time expense.

SUMMARY OF THE INVENTION

An object underlying the invention is to develop a sensor system for the recognition and inspection of overlapping, nonisolated workpieces which is adaptable to various factors, which is sufficiently rapid, and which is economical. It is an object of a described segmentation to separate a division of a progression of a random line (for example of the periphery of a workpiece) into defined sections (segments with defined properties for example into straight line sections, circular sections, and edges), and to describe these sections in the form of an equation. These lines are initially sought out and tracked, by a so-called edge tracking. With the aid of an area filter, a gradient image is formed from the gray scale value image of a scene. From this gradient image, lines are extracted. An arrangement of this type proceeds from the assumption that technical objects, as a rule, can be described by their edges, and that the edges, in turn, can be described by features such as straight line, circle, circular arc, and edges. An arrangement of this type is the subject of German patent application No. P 34 15 467.1, incorporated herein by reference.

As described in German Patent application No. P 34 15 467.1 at page 2 thereof, a known prior art method for extracting lines is set forth in "Detection And Coding Of Edges Using Directional Masks", Robinson, Optical Engineering, Volume 16, No. 6, November-December, 1977, pages 580–585. Therein, an image coding system is described for extracting lines or recognizing objects. As set forth at page 581 of the Robinson reference, the Sobel operator is employed and can be regarded as a combination of two gradient masks, one in the north and the other in the east direction. The outputs of these two masks approximate the partial derivitive in their respective directions. A gradient modulus image is obtained by taking the magnitude of the two orthogonal mask outputs. The direction of the edge (direction angle alpha), in the present case, can also be determined from the outputs of these two masks by an arc tangent operation.

The results of the described segmentation are: straight lines, circles, circular arcs, and edges which originated from a line, and which are also designated as primitives in the literature.

These primitives represent the features for the subsequent scene analysis controlled by stored workpiece models. With the aid of a search tree method, an attempt is made to compose a pattern corresponding to the model from the feature-reserve present in the image, the position and orientation of said pattern then being interpreted as the position and orientation of the desired workpiece. A similarity evaluation of the employed features, which is present in the analysis, is processed into a statement as to whether the workpiece is sufficiently reliably recognized.

Beyond the form recognition, the possibility exists of employing additional features for the recognition, such as, for example, picture half-tone or picture half-tone differences, or quantities which can be derived from picture half-tones (average picture half-tone of an area, textures, colors).

DESCRIPTION OF THE PREFERRED EMBODIMENTS

Overall Arrangement

Figure 1:
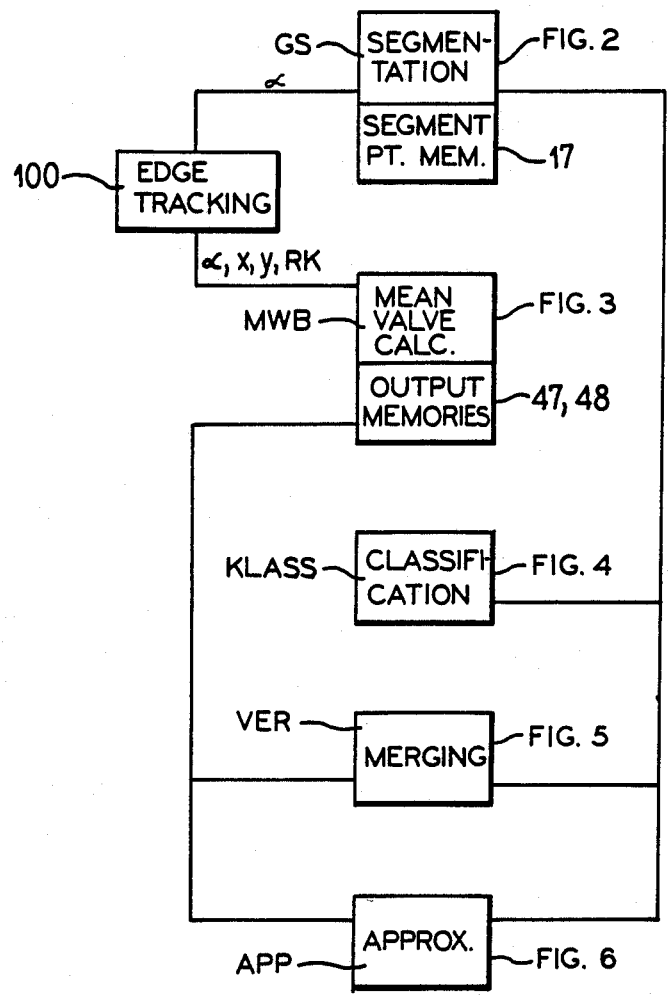
FIG. 1 shows an overview in the form of a block circuit diagram of the entire arrangement.
Figure 2:
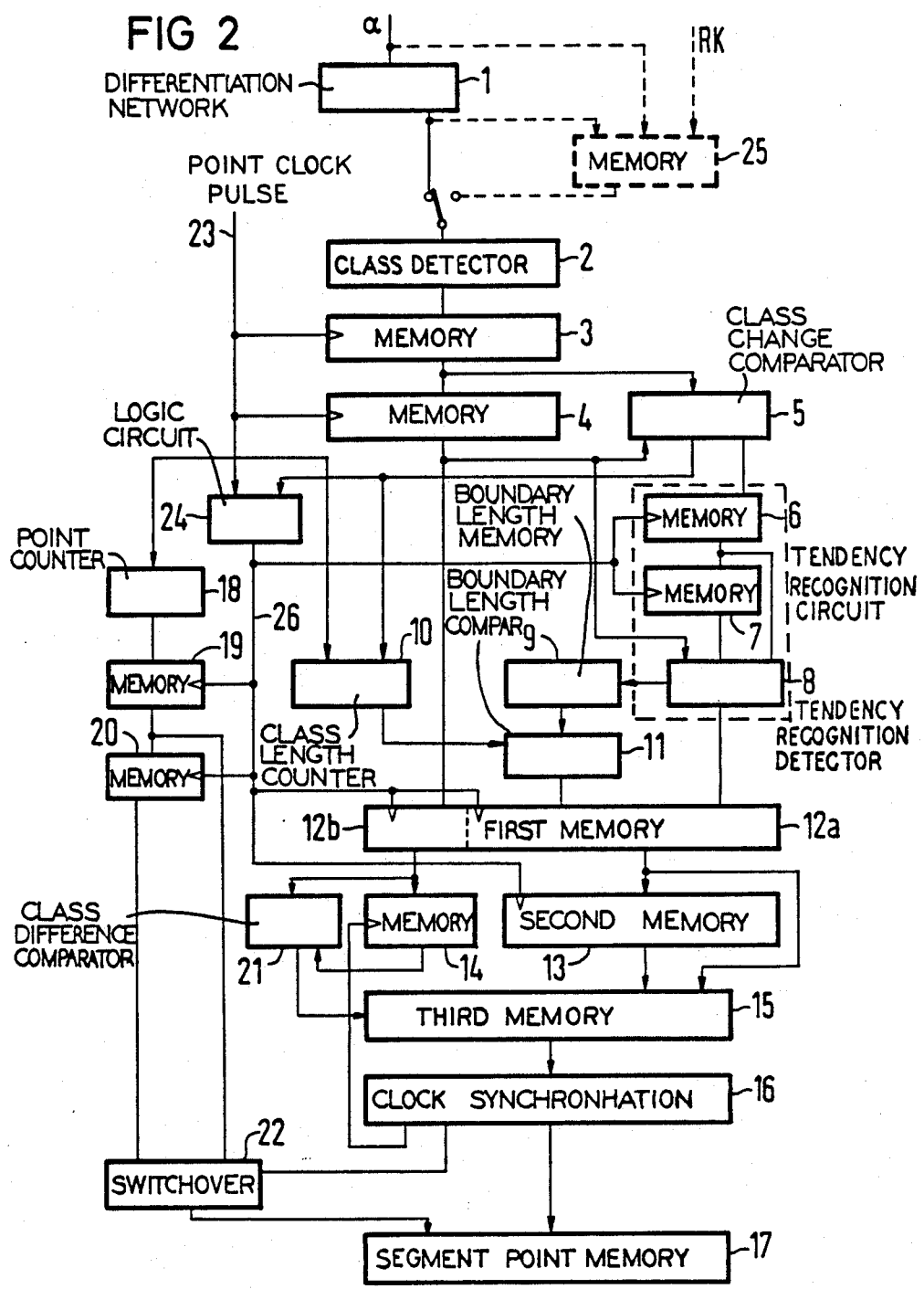
FIG. 2 shows an arrangement for segmentation (rough segmentation)

In FIG. 1 the input data of the selected arrangement comes from an edge tracking in the form of a line list into a rough segmentation GS, explained in greater detail in FIG. 2. Following this rough segmentation is a mean value calculation MWB which is the subject of FIG. 3. The classification KLASS is separately shown in FIG. 4. The merging or fusion VER is described in detail in FIG. 5, and the approximation APP is described in FIG. 6.

Rough Segmentation

Explanation of FIG. 2: 1 designates a differentiating network which differentiates the input data, i.e. the directional angle $\alpha$ of each point of a line, and which smooths the differentiated signals for the purpose of noise suppression. The sequence differentiation-smoothing or smoothing-differentiation is arbitrary. The result is the angular difference triangle $\alpha$ of two successive points in one line. This differentiating network consists, for example, of a subtractor, memories, and adders.

Following the differentiating network a class detector 2 is provided which is realized, for example, by a memory. By the term classes, curvature classes are to be understood. However, it could also be constructed from a comparison angle indicator and a comparator. Following the class detector 2 are the memories 3 and 4 for the purpose of class comparison of successive points. Through a comparator 5 class changes are recognized. The memories 6 and 7 serve, together with a comparator 8 as a tendency detector for the purpose of tendency recognition. Designated as tendency is a sequence or series of changes. Connected with the comparator 8 is a boundary length memory 9. The comparator 8 and the boundary length memory 9 are realized, for example, in a PROM. Also, with each class change, a length counter 10 is reset by the comparator 5, which length counter 10 counts successive points of the same class. Following the boundary length memory 9 and the length counter 10 is the length comparator 11, which classifies line sections of the same class above the boundary length as independent sections. The described modules 8, 9, and 11 can, for example, also be combined in a PROM of suitable size. From the tendency recognition unit 8, the length comparator 11, and the class memory 4, the description of a current fragment which is put in a memory 12a and 12b, results. Memory 12a contains the coding for the tendency and the identification for independent fragments. Memory 12b contains the class of this fragment. A memory 13 contains the portion of the description of the preceding fragment which was stored in memory 12a. In a memory 14, the comparison class is put. A programmable memory 15 contains the algorithm for the entry in a segment point memory 17 and the possible transfer of the class from the memory 12b into the comparison class memory 14. The clock synchronization 16 is connected between the memory 15 and the memory 17 and causes the switchover of the change addresses from the memories 19 and 20.

A point counter 18 is advanced with each line point. The counter reading is transferred into the memory 19 with each class change. The preceding change is in the memory 20.

The segment point decision realized in the memory 15 is controlled from the data of the memory 12a, the memory 13, and the result of a class difference comparator 21. Reference numeral 22 designates the switchover between the memories 19 and 20. Via the line 23, the point clock pulse is supplied. A logic circuit 24 forms the class clock pulse 26 from the point clock pulse and the change output of the comparator 5. The class clock pulse 26 is formed with each class change.

The method cycle or sequence with an arrangement in accordance with the invention proceeds as follows.

The starting point is the line list delivered, for example, from the edge tracking. This list contains the angles and coordinates of all points pertaining to a line in the sequence of the discovered points.

| Point No. | | | | |
|---|---|---|---|---|
| 1 | $\alpha 1$ | x1 | y1 | RK1 |
| 2 | $\alpha 2$ | x2 | y2 | RK2 |
| 3 | $\alpha 3$ | x3 | y3 | RK3 |
| 4 | $\alpha 4$ | x4 | y4 | RK4 |
| 5 | $\alpha 5$ | x5 | y5 | RK5 |
| i | $\alpha i$ | xi | yi | RKi |

Thus, each point is determined by its directional angle $\alpha$, the coordinates x, y, and a direction code RK. The directional angle $\alpha$ is the tangent angle, or the normal offset 90°.

For determination of the segmentation points only the directional angles $\alpha$ are employed. First, the difference angles $\Delta\alpha$ between successive points are formed. There subsequently follows a smoothing over several points. Although the line progression can thus still be clearly reconstructed, it is no longer dependent upon the rotational position. This difference angle $\Delta\alpha$ indicates the curvature of the lines to be examined.

Figure 7:
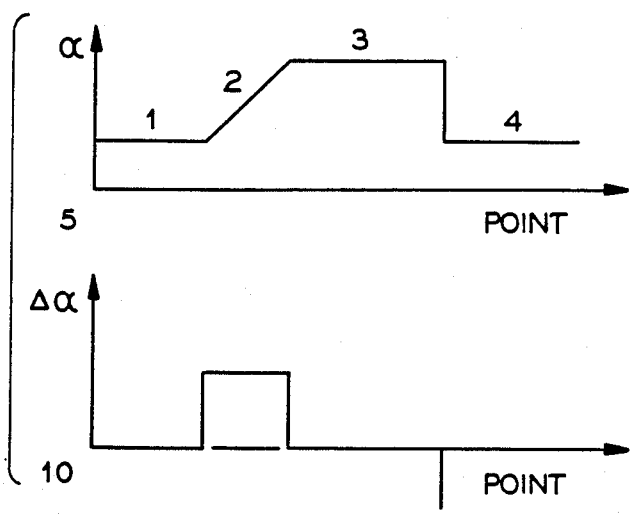
FIG. 7 illustrates a graph of produced angles and difference angles between successive points.

An idealized progression of a line length, consisting of three straight lines (1, 3, 4) and a circle (2) in $\alpha$ and $\Delta\alpha$ representation is shown in FIG. 7.

In the ideal instance, straight line sections appear at the output of the differentiating network 1 (FIG. 2) in the form of lines which coincide with the abscissa, and circles appear as parallel lines to the abscissa. The distance between both is inversely proportional to the radius. Edges appear in the form of needles. In actuality, the transition between edges and small circular sections is continuous.

Figure 8:
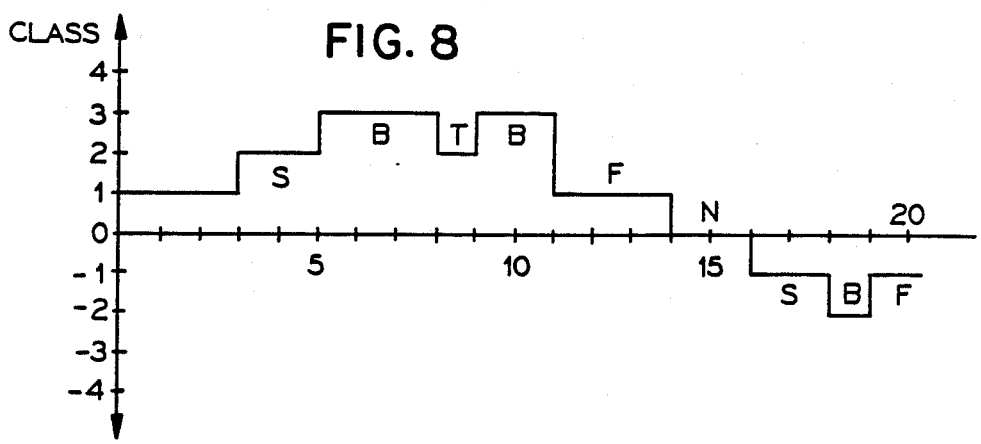
FIG. 8 is a graph illustrating a class list.

For data reduction simplification, the difference angles in the class detector 2 are divided into curvature classes. A so-called class list is prepared. This class list is shown by way of illustration in the example of FIG. 8. All line points are entered therein in the case of a class change, and the respective classes are recorded.

The class change is recognized through comparison of the contents of the memories 3 and 4 in the comparator 5.

The above described class list has the following form, for example:

| The last point number of the class | 3 5 8 9 11 14 16 18 ... |
|---|---|
| | (Point Number) |
| Class | 1 2 3 2 3 1 0 -1 ... |

The point number of the change of the two most recent elements of the class list are put in the memories 19 and 20, the type of change is put in the memories 6 and 7, and the class itself is retained in the memory 12a.

Each segment (points of the same class) is now classified and coded according to its environment as:

| rising slope | S |
|---|---|
| falling slope | F |
| mountain | B |
| Valley | T |

| | |
|---|---|
| or zero-axis crossing | N. |

This code is designated "tendency" and is recognized in the comparator 8 which is controlled by the two alteration memories 6, 7.

These fragments (successive points of the same class) are now classified in dependence upon their class, length, and tendency, and as independent or not independent through the boundary length memory 9, the length counter 10, and the comparator 11. The tendency and the identification for independence are put in the right part (12a) of the memory 12, and the respective class is put in the left part (12b).

Fragments which are not identified as independent can be merged with one another, but independent parts of different classes cannot be merged with one another. This operation takes place in the "segment point decision" (memory 15) 15 and shall be explained later.

The minimum length for independence (in points), for example, is shown below:

| Class Tendency | 0 | 1 | 2 | 3 | 4 | FROM 5 |
|---|---|---|---|---|---|---|
| Slope | 5 | 5 | 5 | 5 | 5 | 5 |
| Mountain | 5 | 5 | 3 | 2 | 1 | 1 |
| Valley | 5 | 5 | 3 | 2 | 2 | 2 |
| Zero Axis Crossing | 5 | — | — | — | — | — |

In a now-following intermediate step, immediately succeeding slopes of the same type, insofar as they are not independent, are combined. This step is not absolutely explicitly necessary. Its task is then assumed by the "segment point decision" (memory 15) 15.

The actual segmentation operation can now proceed. The basic consideration is the following: In the case of edges and transitions between circles of different radii as well as circles and straight lines, slopes result in the $\Delta\alpha$ representation and hence also in the class representation. Thus, segmentation boundaries or limits are to be placed at these points.

Figure 9:
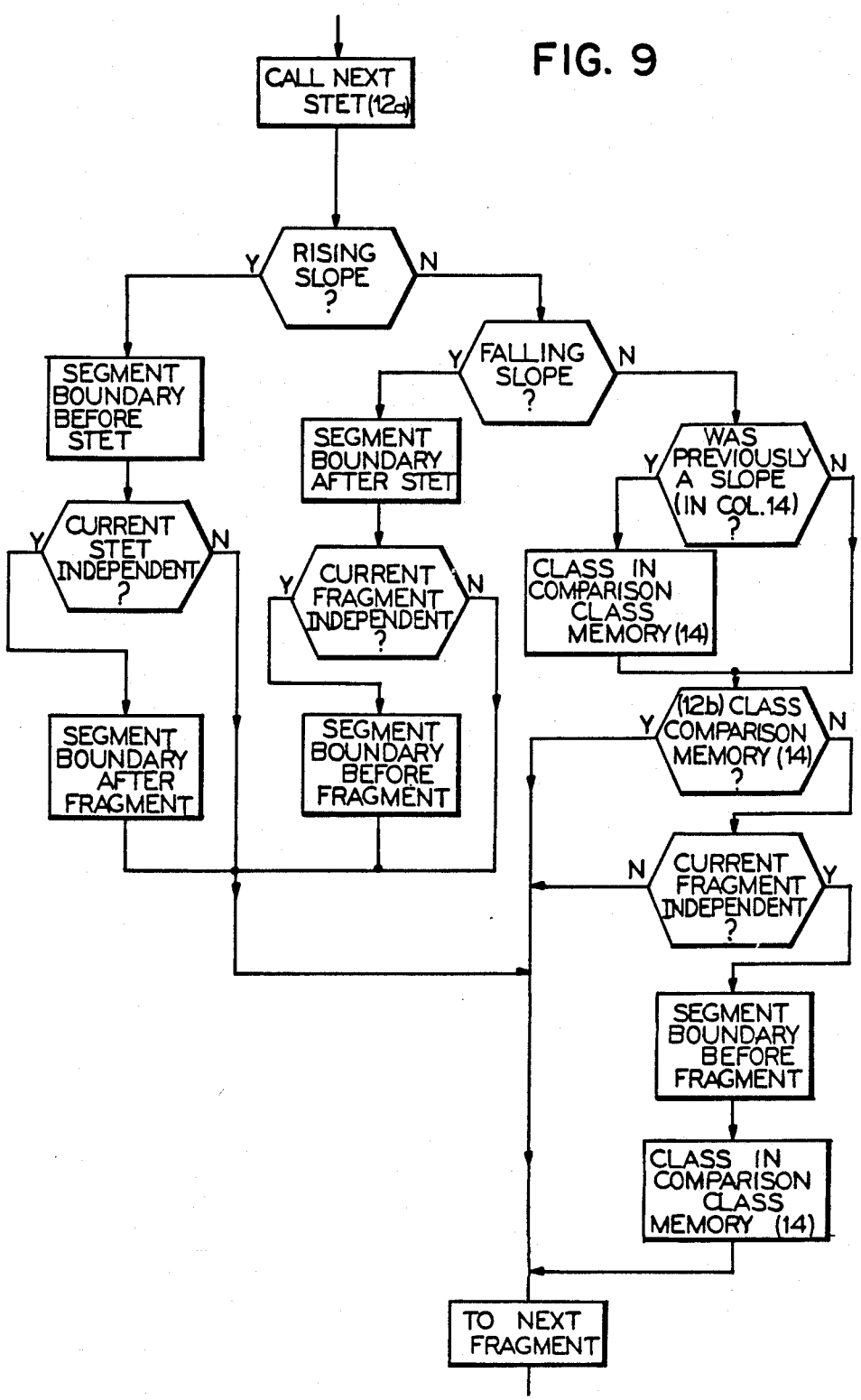
FIG. 9 is a flow chart showing the segmentation operation.

The precise cycle can be described most simply by the flow diagram shown in FIG. 9.

In FIG. 9, the "Segment Boundary before Fragment" is taken from the memory 20. The "Segment Boundary after Fragment" is taken from the memory 19 (Y=yes, i.e. condition met; n=no, i.e. condition not met, in FIG. 9).

Figure 10:
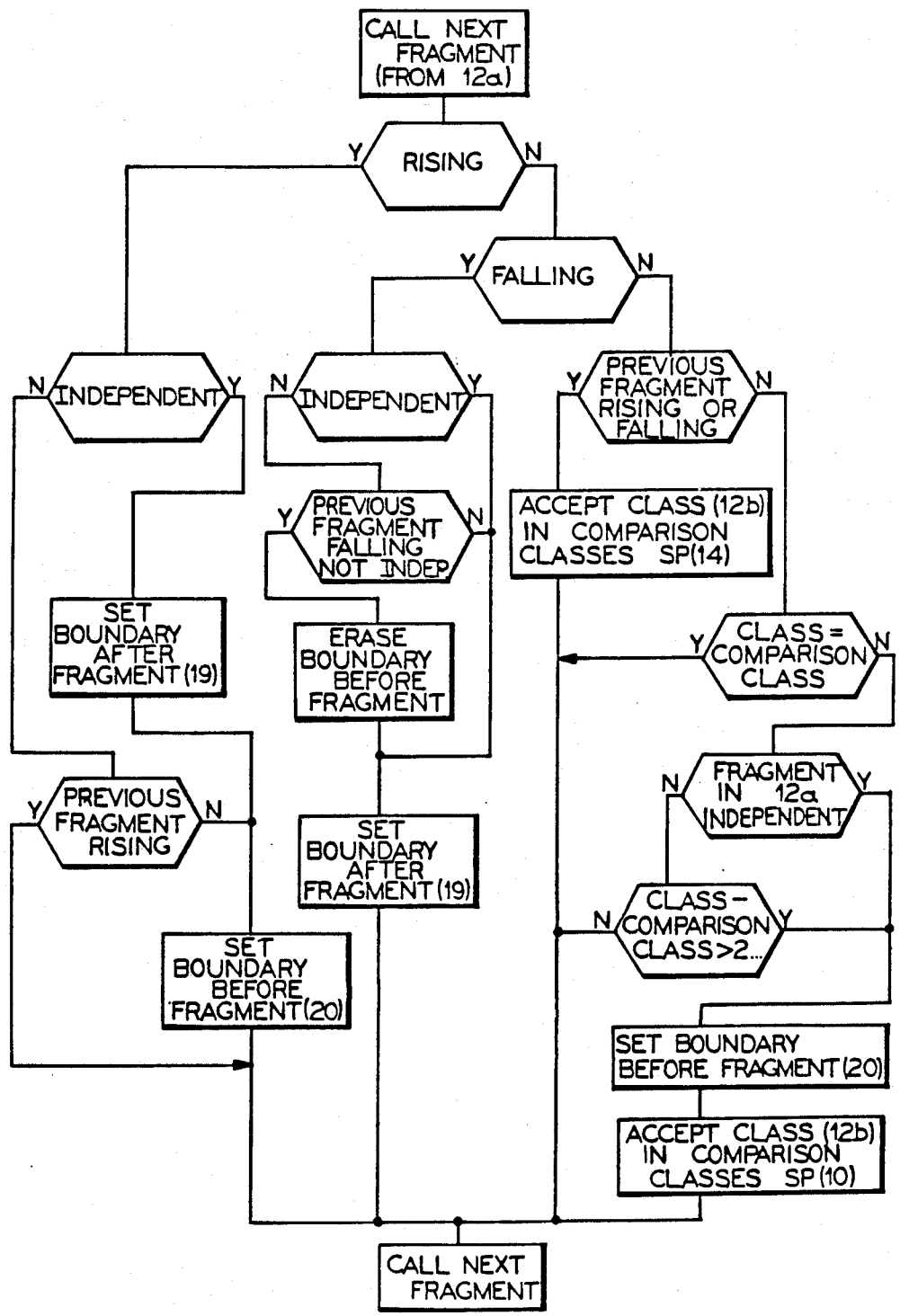
FIG. 10 is a flow chart wherein an intermediate step for combining similar slopes immediately succeeding one another is not employed.

If the intermediate step for combining like slopes immediately succeeding one another is dispensed with, the flow diagram looks as shown in FIG. 10.

As the result of these cited operations, the line is now divided into pieces called "segments" with specific properties.

In the arrangement according to the invention, the illustrated steps proceed sequentially in groups connected behind one another, controlled by the result of the predecessors, respectively. In each group, always the current line piece or segment with its surroundings is observed.

| | |
|---|---|
| First Group: (Modules 1–5 and 24) | Processing of each image point. Smoothing and formation of $\Delta\alpha$ Division of $\Delta\alpha$ into classes Recognition of class changes |
| Second Group: | Processing of n successive points of the same class. |
| (Modules 6–11) | Determination of the class length n and classification, taking into consideration the neighbor class sections, into rising or falling edge sections, into mountain sections or valley sections (tendency) allocation of independence if the boundary length has been reached. |
| Third Group: (Modules 12–22) | Segment Point Decision Combination of immediately succeeding sections of the same tendency Repeated smoothing through combination of non-independent parts Segment Point Decision Entry of the segment points. |

In FIG. 2, in broken lines, an additional variation is indicated which, according to the later analysis according to FIG. 3, renders possible an exact determination of the radius. For example, in a memory 25, for example a PROM, from the difference angle $\Delta\alpha$, the preceeding input angle $\alpha$, and the direction code RK (likewise contained in the list), the raster error of $\alpha$ is cancelled, i.e. the curvature of the scanned curve is exactly determined. Mathematically, the curvature is the reciprocal value of the curvature radius, and thus the radius is determined. For this variation, subsequently in the segmentation, calculation is effected, and instead of with $\Delta\alpha$, with the correct curvature. In exchange, in the later calculation of the mean values, the summing-up of the arc length (FIG. 3) is dispensed with. In the approximation, the radius calculation is further reduced to the reciprocal value formation of the mean value of $\Delta\alpha$.

The direction code indicates by which preceeding picture point or scanning element the line point was activated. The direction code corresponds in the literature to the Freeman-chain-code and indicates the direction of the eight adjacent points of a point in an orthogonal raster.

Mean Value Formation

Figure 3:
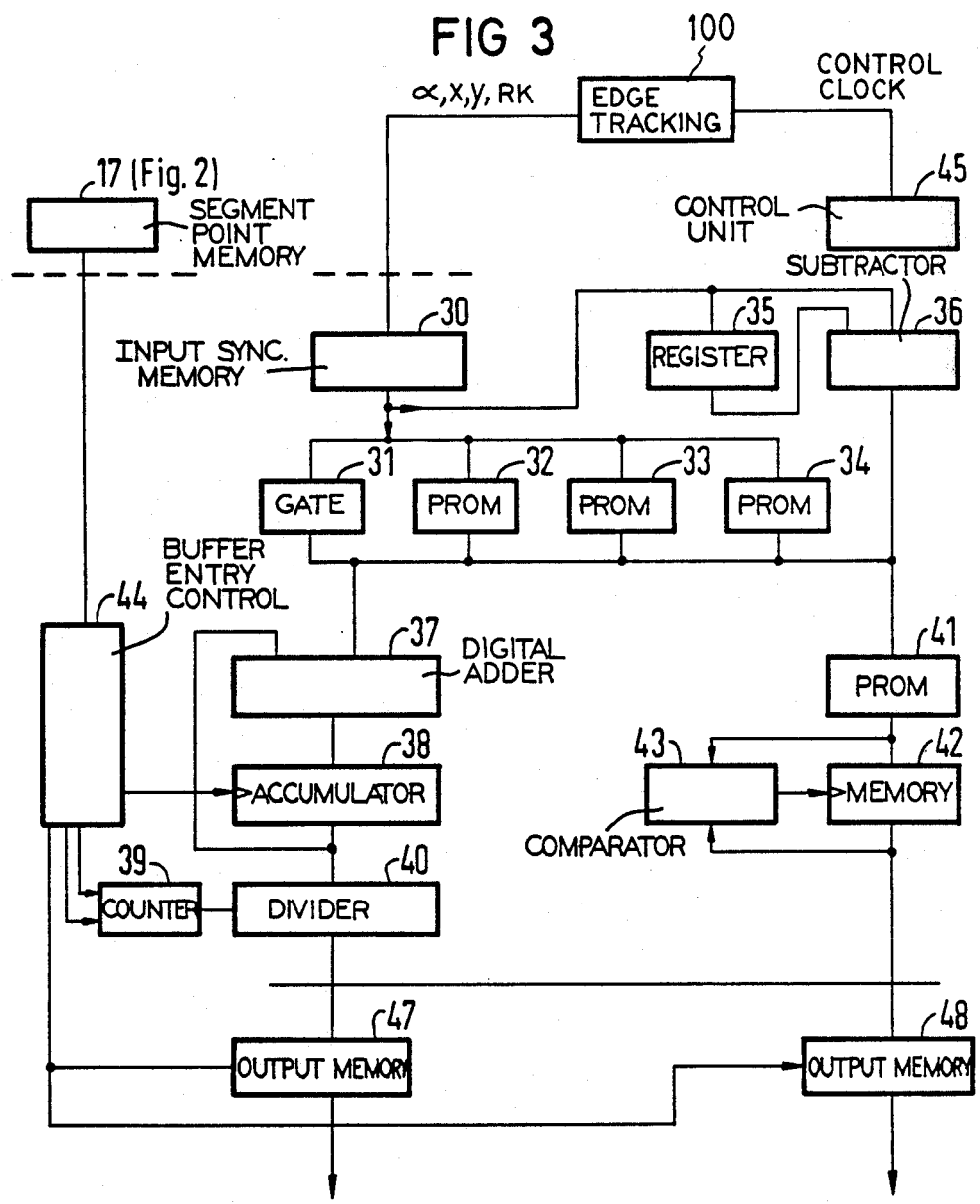
FIG. 3 shows an arrangement for calculation of the mean values which are required for further segmentation steps.

In the arrangement according to FIG. 3, the sum formation, the maximum value determination for $\Delta\alpha$, and possibly the mean value formation proceed via a segment length. These values are required for the following classification and approximation of the segments into straight pieces, circular segments, edges, and parts which cannot yet be sufficiently defined.

Coming from the segment point memory 17 of FIG. 2 (for example, RAM) are the segment boundaries, and parallel thereto, via an input synchronization memory 30 (for example, register) are the data which derive from the edge tracking unit 100 and which are to be processed. This data is the direction $\alpha$, the coordinates x, y, and the tracking direction code RK. The $\Sigma$ arc length (for example via PROM 34), the sum of the differential angle $\Delta\alpha$ (for example via register 35 and subtractor 36), the sums of the coordinates x, y (via gate 31), $\Sigma \cos \alpha$ (for example via PROM 32), and $\Sigma \sin \alpha$, (for example, via PROM 33) are respectively formed over a segment length from the input data. In addition, the square of the maximum $\Delta\alpha^2$ (PROM 41, memory 42, comparator 43) within a segment is sought. Serving the purpose of sum formation is an adder 37 in conjunction with an accumulator 38 (for example, a register). A portion of the sums formed in 37, 38, by means of the counter 39 and the divider 40 (for example, a PROM with a reciprocal value of the counter reading and multiplier) is normalized to the segment length, i.e. the mean value over a segment is formed. A buffer entry control 44 (for example, programmable logic array) brings about the successive entry of the calculated values into the output memory 47, 48 (RAM). The output memories are connected as alternating buffer memories. Each memory contains, under one address, several sub-addresses for receiving the individual computational results. It could also be divided into several regions. A control unit 45 (for example, a microprocessor) controls the overall operating sequence and the selection of the input data and the data paths within the circuit.

The operating sequence shall be explained on the basis of the example of the sum sin $\alpha$ and of $(\Delta\alpha$ maximum$)^2$.

The data comes, for example, from an edge tracking into the input memory 30. Through the control unit 45 it is guaranteed that, during the formation of the $\Sigma \sin \alpha$, the direction angle is connected to the input of memory 30. In parallel with the data, the segment point memory 17 is read out. The data $\alpha$ from the input memory 30 is converted in the PROM 33 into sin $\alpha$. Successively, data is called from the edge tracking, converted, and added in adder 37 and accumulator 38. Simultaneously, the counter 39 is incremented. It thus always contains the number of points previously added in the current segment.

In the divider 40, the result of the addition is continuously divided by the counter reading in counter 39. The division result is constantly entered into one of the output memories 47 or 48. Accordingly, the last-calculated value per segment is always in the output memory. All previously calculated values are overwritten. With each segment boundary, which is supplied by the memory 17, the accumulator 38 and the counter 39 are erased. Subsequently, the address of the output memories 47 or 48 is increased. Of course, the intermediate results need not constantly be entered into the output memory. However, this simplifies the final treatment.

Similarly to the sine, the cosine and the arc length are formed. The arc length $\Delta\alpha$, and the sum "n" equal to length of segment, is not divided by the segment length which is in the counter 30. This is achieved, for example, by virtue of the fact that a counter reading "1" is specified here in fixed manner.

The coordinates x and y need not be specially converted. They are connected via the gate 31 directly to the adder 37.

The determination of the $(\Delta\alpha_{max})^2$ proceeds, for example, in the following manner.

The input data passes through the synchronization memory 30 (current value). In the memory 35 is the value of the preceding point. The subtractor 36 subtracts the current value from the preceeding value equal to $\Delta\alpha$. The PROM 41 forms therefrom the square of $\Delta\alpha$. This value is transferred to the maximum value memory 42 when the current amount $(\Delta\alpha)^2$ is greater than the memory contents. This is established by the comparator 43. The entry in the output memory 47, 48 proceeds as described above. Also, the maximum value memory is erased with each segment boundary.

Classification

Figure 4:
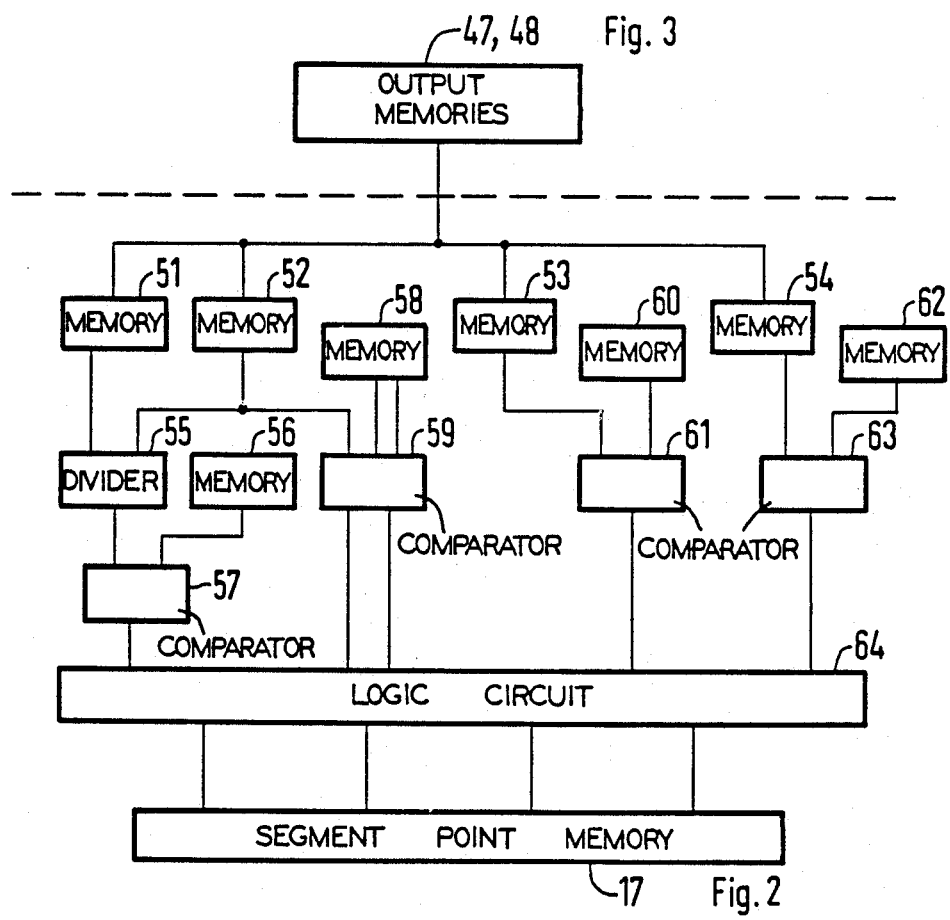
FIG. 4 shows an arrangement for classification.

In the arrangement according to FIG. 4, the values of 47 and 48 of FIG. 3 are successively read into the intermediate memories 51 through 54. The contents of the memories 51 and 52 are divided in divider unit 55, and the division result is compared in the comparator 57 with the threshold in a memory 56. In addition, the contents of the memory 52 is compared with two thresholds in the memory 58 by means of the comparator 59. In the same fashion, the contents of the memories 53 and 54 are compared with the thresholds in the memories 60 and 62, respectively, by means of the comparators 61 and 63, respectively. The five comparison results from the comparators 57, 59 (two outputs), 61 and 63 are linked in a logic circuit 64 (for example, a freely programmable memory or PROM or a fixed logic operation). At the output of the circuit 64 the line sections ascertained in the arrangements according to FIG. 1 and FIG. 2 appear (for example, classified as a straight line, circular arc, edge, or undefined parts), and are put in the segment point memory 17, FIG. 2. The classification code is described in FIG. 4. The thresholds in the memories 56, 58, 60 and 62 are adjusted in dependence upon the expected recognition results.

Figure 11:
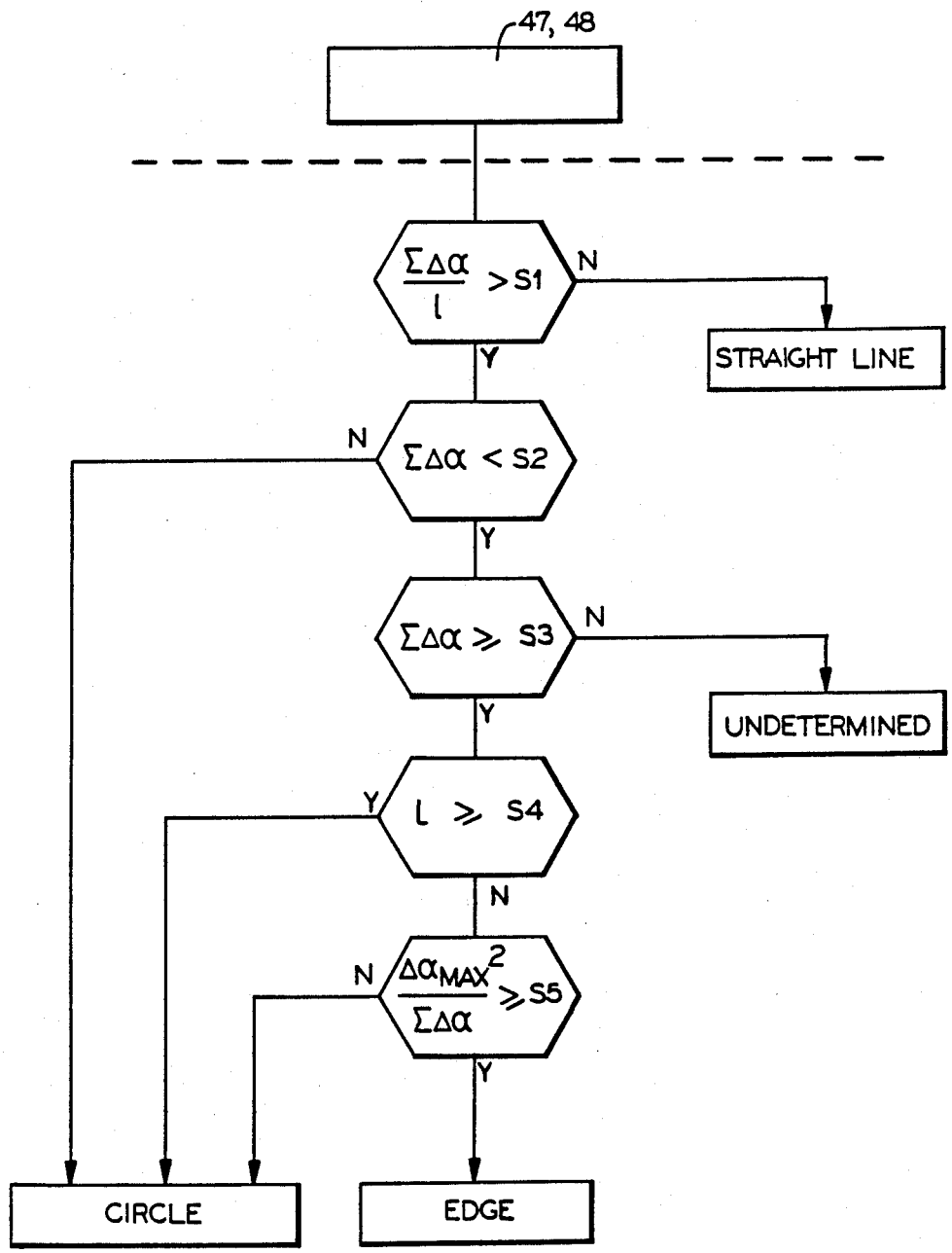
FIG. 11 is a flow chart for illustrating performance of a classification algorithm according to FIG. 4.

The entire circuit according to FIG. 4, for example, performs the classification algorithm illustrated in the flow diagram of FIG. 11. The threshold in the memory 56 is designated with F1, the thresholds in the memory 58, with S2 and S3, the threshold in the memory 60 with S4, and the threshold in the memory 52 with F5.

Merging

Figure 5:
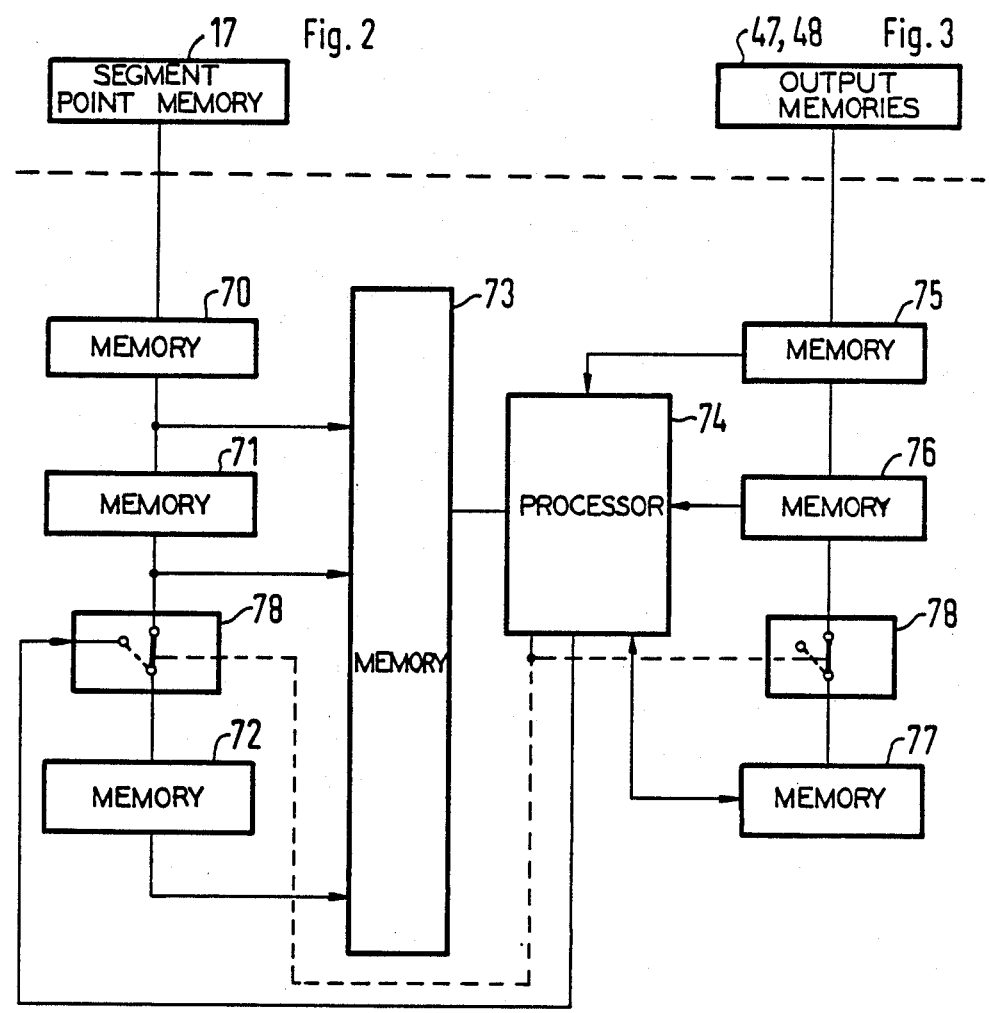
FIG. 5 shows an arrangement for the merging of segments.

The arrangement according to FIG. 5 serves the purpose of merging segments classified in the arrangement according to FIG. 4. For this purpose, three memories 70–72 are provided which receive the segment class codes of three immediately successive segments produced in the circuit 64 (FIG. 4), and which were intermediately stored in 17 (FIG. 2). The outputs of the memories 70–72 are processed in a circuit 73 (for example, a memory or PROM), and provide an indication with respect to a rule for computing a numerical value which runs in a processor 74. Reference numerals 75–77 are memories for parameter sets which are associated with the segment class code memories 70–72. A switch 78 provides the possibility of loading the memory 72 either from the input data or dependent upon the results of the merging operation in the processor 74. Likewise, the memory 77 can be loaded either directly by the memory 76 or by the memory 74.

Figure 12:
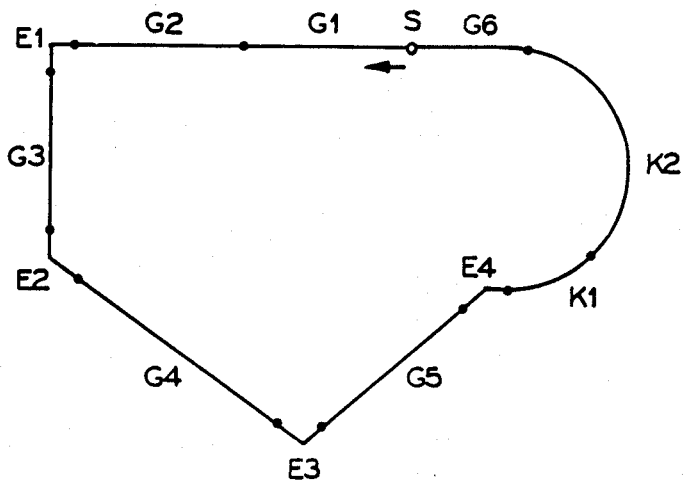
FIG. 12 illustrates a sequence of segments beginning from a start point S to explain operation of the arrangement according to FIG. 4.

The method of operation of the arrangement according to FIG. 4 shall be explained on the basis of an example. The following segments, for example, are supplied from the classification, whereby the sequence, beginning with the start point S, is observed in a counter-clockwise direction, and as shown in FIG. 12:

| | |
|---|---|
| Straight line | G1 |
| Straight line | G2 |
| Edge | +E1 |
| Straight line | G3 |
| Edge | +E2 |
| Straight line | G4 |
| Edge | +E3 |
| Straight line | G5 |
| Edge | −E4 |
| Circle | +K1 |
| Circle | +K2 |
| Straight line | G6 |

At the beginning of the operation, the memories 70–72 are erased. The individual segments are pushed through the memory in the manner of a shift register. The processing commences as soon as all memories are filled.

In the illustrated example, this is the case if the edge E1 is stored in the memory 70, the straight line G2 is stored in 71, and the straight line G2 is stored in 72. The respective parameter sets are in the memories 75-77—namely, for E1 in 75, for G2 in 76, and for G1 in 77. It is now checked whether segments are stored in the memories 70-72 suitable for merging. For this purpose, there are connected to the output of each memory the classification codes which, for example, consist of two bits, respectively (see classification code in conjunction with the specification regarding FIG. 4). The three codes address the memories 72 in which, in the address memory cell, an additional address is stored which leads to the valid processing rule for the present case in the program memory of the processor 74. The memory 73, naturally, can also be realized in the form of a logic operation.

The processing rules in the processor 74 generally check the center segment (memory 71) with its adjacent segments (memories 70, 72) as to the possiblity of merging. In the present case G1 G2 E1, the rule is as follows, for example: Check the straight line G1 and the straight line G2 as to mergeability, i.e. with the parameters a new segment is to be formed from 76 and 77. It is then examined whether this new segment still corresponds to the straight line criteria in this example according to arrangement 4. If this is the case, the straight lines G1 and G2 are combined. If the criterion for the straight lines is not satisfied, by contrast the original segments are maintained.

In the case of merging, the switch 78 is switched over to the position illustrated in broken lines, and the memory 72 is newly written or specified, possibly with a new classification code from the processor 74, and the combined parameters of the two original segments G1, G2 are read into the memory 77. Simultaneously, a new element is subsequently called into the memory 70 and the old contents of the memory 70 are read into memory 71. The present contents of memory 71 have therefore been overwritten. In the present case, there is in the memory 72, after the merging, the same code as previously, because two straight lines have been merged into one straight line. The memories 75-76 for the parameter sets are treated in a manner analogously thereto.

In the selected example, the combination G1-G2 is now in memory 72, E1 in memory 71 and G3 in memory 70. In the present case, the rule is not to merge. The switch 78 is brought into the vertical position and the shift register function is again established. The processor 74 thus causes a new segment to be transferred to the memories 70 or 75 respectively, and a segment for further processing is released from the memory 72 or 77, respectively.

The remaining segments are examined in an analogous fashion. A new merging is only conducted when the segment K2 is in the memory 71 or 76 respectively, K1 is in the memory 72 or 77 respectively, and G6 is in memory 70 or 75 respectively. In the case of the circle, for example, it is checked whether the curvatures agree within a specific tolerance. If this is the case, then the two segments are merged. If the curvatures do not agree, they remain separated.

The undefined segments according to arrangement 4 relate to short, weakly curved line segments which cannot be clearly classified. They are always merged with neighboring segments. At the end of the merging operation, no undefined segments are present any longer.

A further possibility of parameter calculation of segments to be merged proceeds as follows: The boundary marking between two merged segments is erased from the segment memory 17, and after termination of the merging operation, a new computational operation for this line in the arrangement according to FIG. 3 with these new boundaries is started.

Approximation

Figure 6:
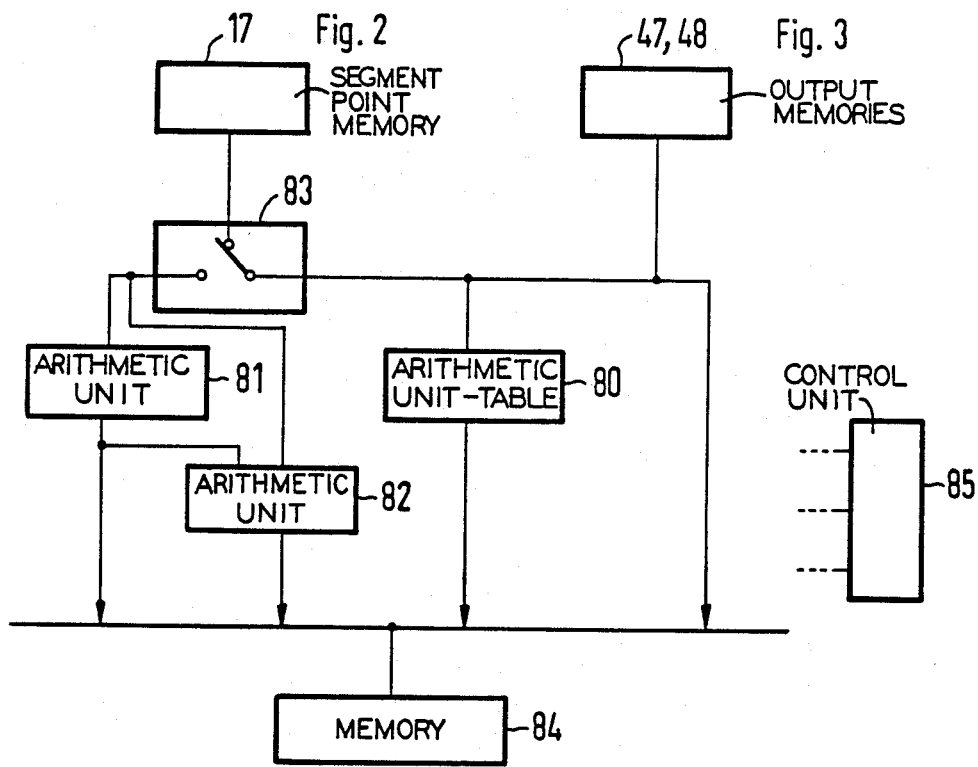
FIG. 6 shows an arrangement for the approximation of segments.

An arrangement for approximation is schematically illustrated in FIG. 6. The goal of this approximation is to represent the ascertained line segments in as simple as possible a mathematical form. The input data for the approximation is contained in the output memories 47, 48 (FIG. 2, Segment parameters), or 17 (FIG. 1, classification codes). Reference numeral 80 designates an arithmetic unit or a table, 81 likewise designates an arithmetic unit, and 82 designates an additional arithmetic unit. The arithmetic units 81 and 82 are connected as needed via a switch 83. Reference numeral 84 is a memory for receiving the calculated values.

In this arrangement, straight lines are determined by their center point coordinates $\Sigma x/n$, $\Sigma y/n$, by their orientation arctan $\Sigma \sin \alpha / \Sigma \cos \alpha$, and their length. From the parameter set (contained in 47, 48) only the orientation is additionally determined by means of the arithmetic unit 80. Edges are represented by $\Sigma x/n$, $\Sigma Y/n$, by the orientation arctan $\Sigma \sin \alpha / \Sigma \cos \alpha$, and by their angle of aperture $\Sigma \Delta \alpha$. From the parameter set (contained in 47, 48) likewise only the orientation is additionally determined with the arithmetic Circular segments are represented by their center point coordinates, by the radius, by the orientation arctan $\Sigma \sin \alpha / \Sigma \cos \alpha$ and their angle of aperture $\Sigma \Delta \alpha$. When in the memory 17, a segment was classified as a circular segment, then, via the switch 83, the arithmetic unit for radius 81 and center point 82 are additionally connected thereto. The radius is calculated according to the following formula:

$$ \vartheta_r = \frac{180}{\pi} \cdot \frac{\text{arc length}}{\Sigma \Delta \alpha} $$

The center point coordinates are calculated to:

$$ x_M = \frac{\Sigma x}{n} - r \cdot \frac{\Sigma \cos \alpha}{n} $$

$$ y_M = \frac{\Sigma y}{n} - r \cdot \frac{\Sigma \sin \alpha}{n} $$

The final parameters are partially directly transferred from the parameter set in 47 and 48 into the memory 84, and partially written by the arithmetic units 80-82 into the memory 84, and are then available in ordered or classified fashion according to type for further processing.

The control unit 85 serves the purpose of through-connection of the data paths and association of the memory 84. It is, for example, programmable components and memories, or a microprocessor.

Although various minor changes and modifications might be proposed by those skilled in the art, it will be understood that we wish to include within the claims of the patent warranted hereon all such changes and modifications as reasonably come within our contribution to the art.

We claim as our invention:

1. A system for segmentation, classification, merging, and approximation of lines sought out and tracked by an edge tracking unit tracking an object, the lines being defined according to the edge tracking unit by a sequence of points wherein each point has associated with it a direction angle $\alpha$, coordiantes x, y, and a direction code RK delivered by the edge tracking unit, comprising:

segmentation means for receiving the directional angles $\alpha$ from the edge tracking unit and for storing in a segment point memory means segments of a line with a determined boundary;

mean value calculation means connected to the segment point memory means and to the edge tracking unit for receiving from the segment point memory means said stored segments, for receiving from the edge tracking unit the direction angle $\alpha$, coordinates x, y, and direction code RK, and for placing in an associated output memory means calculated values;

classification means connected to the output memory means and to the segment point memory means for classification of said stored line segments with a determined boundary obtained from the segment point memory means;

merging means connected to the segment point memory means and to the output memory means for merging of adjacent, classified segments which are sufficiently alike; and approximation means connected to the segment point memory means and said output memory means for approximation of determined segments.

2. A system according to claim 1 wherein said segmentation means includes:

a differentiating network having an output connected to a class change comparator;

a tendency recognition means including a tendency recognition detector connected following the class change comparator;

a class length counter connected parallel to the tendency recognition means;

a boundary length memory and a following connected boundary length comparator connected parallel to the tendency recognition detector;

a first memory means connected following the tendency recognition detector, the boundary length comparator, and the class change comparator, and for providing a description of a line section;

second memory means connected following the first memory means for providing a description of a preceding line section;

a third memory means comprising a read-only memory connected following the second memory means and for deciding with aid of a stored algorithm whether line sections correspond to segments or not; and said segment point memory means being connected following the third memory means for storing segments with a determined boundary.

3. A system according to claim 1 wherein said means value calculating means includes:

subtractor means for angle difference formation;

a digital adder means connected to the substractor means for sum formation;

counter means for length determination;

means including a memory and comparator connected to an output of the subtractor means for determination of a maximum difference angle; and divider means connected following the digital adder means and to an output of said counter means for mean value formation.

4. A system according to claim 1 wherein said classification means for line segments includes:

comparator means for comparison of a total angle change over a given segment, for comparison of a mean angle change over a give segment, and for comparison of a maximum angle change over a given segment relative to said total change within a given segment; and means including limit value memory means connected to the comparator means, a divider means connected to the comparator means, and a logic circuit connected to an output of the comparator means and also to said second point memory means for classification of the segments into straight lines, circular segments, edges, and still undetermined pieces.

5. A system according to claim 1 wherein said merging means for merging adjacent, classification segments which are sufficiently alike includes:

a plurality of first memory means for recieving a segment class code of adjacent segments;

second memory means connected to outputs of and addressed by the plurality of first memory means;

a plurality of third memory means for producing parameter sets; and a processor means connected following the second memory means and also to outputs of said third memory means for selecting a rule or computing a numerical value based on an address code word from the second memory means, and from said parameter sets producing a new parameter set and a new segment class code.

6. A system according to claim 1 wherein said approximation means for approximation of segments includes:

a first arithmetic means connected to a memory for determination of inclination or orientation of classified segments;

second and third arithmetic unit means connected to said memory for determination of radius and center point coordinates as a supplement to already present parameters; and control unit means for placing outputs of said first, second and third arithmetic unit means in said memory for further processing.

* * * * *